(12) United States Patent
Louco et al.

(10) Patent No.: US 12,732,127 B2
(45) Date of Patent: Sep. 8, 2026

(54) SYSTEMS AND METHODS FOR CONFIGURABLE ELECTRICAL INVERTER

(71) Applicant: BorgWarner Inc., Auburn Hills, MI (US)

(72) Inventors: Lathom Alexander Louco, Arden, NC (US); Andreas Mayer, Clarkston, MI (US); Jeffrey Carter, Harrogate (GB)

(73) Assignee: BorgWarner Inc., Auburn Hills, MI (US)

( * ) Notice: Subject to any disclaimer, the term of this patent is extended or adjusted under 35 U.S.C. 154(b) by 316 days.

(21) Appl. No.: 18/444,246

(22) Filed: Feb. 16, 2024

(65) Prior Publication Data

US 2025/0266779 A1 Aug. 21, 2025

(51) Int. Cl.

| | |
|---|---|
| ***H02P 1/32*** | (2006.01) |
| ***B60L 15/00*** | (2006.01) |
| ***H02P 25/18*** | (2006.01) |
| ***H02P 25/22*** | (2006.01) |
| ***H02P 27/06*** | (2006.01) |

(52) U.S. Cl.

CPC .......... *H02P 25/184* (2013.01); *B60L 15/007* (2013.01); *H02P 25/22* (2013.01); *H02P 27/06* (2013.01); *B60L 2210/40* (2013.01)

(58) Field of Classification Search

CPC ........ H02P 25/184; H02P 27/08; H02P 23/14; H02P 25/22; H02P 27/06

See application file for complete search history.

(56) References Cited

U.S. PATENT DOCUMENTS

| | | | |
|---|---|---|---|
| 4,270,163 | A | 5/1981 | Baker |
| 11,545,923 | B2 | 1/2023 | Choi et al. |
| 2009/0268490 | A1 | 10/2009 | Wagoner et al. |
| 2014/0042807 | A1 | 2/2014 | Bouchez et al. |
| 2020/0366232 | A1 | 11/2020 | Kinjo et al. |
| 2021/0146782 | A1 | 5/2021 | Lehn et al. |
| 2022/0173687 | A1 | 6/2022 | Choi et al. |
| 2022/0385211 | A1 | 12/2022 | Jang et al. |
| 2023/0238895 | A1 | 7/2023 | Moon et al. |
| 2023/0369664 | A1 | 11/2023 | Yoscovich et al. |

FOREIGN PATENT DOCUMENTS

| | | | | | |
|---|---|---|---|---|---|
| CN | 109510446 | A * | 3/2019 | | H02M 1/14 |
| DE | 102014224476 | A1 | 6/2016 | | |
| EP | 1679783 | B1 | 9/2016 | | |
| JP | 2015046972 | A | 3/2015 | | |
| JP | 2020124018 | A | 8/2020 | | |
| JP | 7104642 | B2 * | 7/2022 | | H02P 25/18 |
| WO | 2017020177 | A1 | 2/2017 | | |
| WO | WO-2022054181 | A1 * | 3/2022 | | H02P 25/18 |

* cited by examiner

*Primary Examiner* — Karen Masih

(74) *Attorney, Agent, or Firm* — Joshua M. Haines; Bookoff McAndrews, PLLC

(57) ABSTRACT

A system includes: an inverter configured to convert DC power from a voltage source to AC power to drive a motor including a plurality of windings, wherein the inverter includes: a first inverter to be connected to a first end of a first winding of the plurality of windings and a first end of a third winding of the plurality of windings; a second inverter to be connected to a first end of a second winding of the plurality of windings and a second end of the first winding of the plurality of windings; and a third inverter to be connected to a second end of the third winding of the plurality of windings and a second end of the second winding of the plurality of windings.

20 Claims, 12 Drawing Sheets

SYSTEMS AND METHODS FOR CONFIGURABLE ELECTRICAL INVERTER

TECHNICAL FIELD

Various embodiments of the present disclosure relate generally to electrical inverters, and more particularly, but without limitation, to configurable electrical inverters used in high voltage circuits such as electric vehicle applications.

BACKGROUND

Electrical inverters are widely used in high voltage applications, such as in electric vehicles. For example, electric vehicles typically employ multi-phase motors, which may use various winding configurations. Each winding configuration may have advantages and disadvantages, for example at different rotational speeds of the motor.

The present disclosure is directed to overcoming one or more of these challenges.

SUMMARY OF THE DISCLOSURE

In some aspects, the techniques described herein relate to a system including: an inverter configured to convert DC power from a battery to AC power to drive a motor including three phase windings, wherein the inverter includes: a first three-phase inverter including three legs, wherein each leg of the three legs is to be connected to a first node of a voltage source, to be connected to a second node of the voltage source, and to be connected to a first end of a respective phase winding among the three phase windings of the motor; a breaker switch including a first connection and a second connection, the first connection connected to the second node of the voltage source; and a second three-phase inverter including three legs, wherein each leg of the three legs is to be connected to the first node of the voltage source, connected to the second connection of the breaker switch, and to be connected to a second end of the respective phase winding among the three phase windings of the motor.

In some aspects, the techniques described herein relate to a system, wherein the breaker switch is operable to close to connect the three legs of the second three-phase inverter to the second node of the voltage source to configure the three phase windings in an Open Ended Winding (OEW) configuration.

In some aspects, the techniques described herein relate to a system, wherein each leg of the three legs of the second three-phase inverter includes a lower switch, each lower switch including (i) a first end to be connected to the respective phase winding and (ii) a second end connected to the second connection of the breaker switch.

In some aspects, the techniques described herein relate to a system, wherein (i) the breaker switch is operable to open to disconnect the three legs of the second three-phase inverter from the second node of the voltage source, and (ii) each lower switch is operable to close to connect each first end of the three phase windings to each other to configure the three phase windings in a Wye configuration.

In some aspects, the techniques described herein relate to a system, further including: one or more controllers configured to (i) control the breaker switch to open or close, and (ii) control each lower switch to open or close.

In some aspects, the techniques described herein relate to a system, wherein the one or more controllers are further configured to: determine that a parameter associated with the motor is beyond a threshold; and control the breaker switch to open and each lower switch to close.

In some aspects, the techniques described herein relate to a system, further including: the battery configured to supply the DC power to the inverter; and the motor configured to receive the AC power from the inverter to drive the motor, wherein the system is provided as a vehicle including the inverter, the battery, and the motor.

In some aspects, the techniques described herein relate to a system including: a first three-phase inverter including three legs, wherein each leg of the three legs is to be connected to a first node of a voltage source, to be connected to a second node of the voltage source, and to be connected to a first end of a respective phase winding among three phase windings of a motor; a breaker switch including a first connection and a second connection, the first connection connected to the second node of the voltage source; and a second three-phase inverter including three legs, wherein each leg of the three legs is to be connected to the first node of the voltage source, connected to the second connection of the breaker switch, and to be connected to a second end of the respective phase winding among the three phase windings of the motor.

In some aspects, the techniques described herein relate to a system, wherein the breaker switch is operable to close to connect the three legs of the second three-phase inverter to the second node of the voltage source to configure the three phase windings in an Open Ended Winding (OEW) configuration.

In some aspects, the techniques described herein relate to a system, wherein each leg of the three legs of the second three-phase inverter includes a lower switch, each lower switch including (i) a first end to be connected to the respective phase winding and (ii) a second end connected to the second connection of the breaker switch.

In some aspects, the techniques described herein relate to a system, wherein each leg of the second three-phase inverter includes a respective upper switch that operates in a reverse-blocking mode.

In some aspects, the techniques described herein relate to a system, further including: one or more controllers configured to control each upper switch to open or close.

In some aspects, the techniques described herein relate to a system, wherein (i) the breaker switch is operable to open to disconnect the three legs of the second three-phase inverter from the second node of the voltage source, and (ii) each lower switch is operable to close to connect each first end of the three phase windings to each other to configure the three phase windings in a Wye configuration.

In some aspects, the techniques described herein relate to a system, further including: one or more controllers configured to (i) control the breaker switch to open or close, and (ii) control each lower switch to open or close.

In some aspects, the techniques described herein relate to a system, wherein the one or more controllers are further configured to: determine that a parameter associated with the motor is beyond a threshold; and control the breaker switch to open and each lower switch to close.

In some aspects, the techniques described herein relate to a method including: operating an inverter circuit to configure one or more windings of a motor in an Open Ended Winding configuration, the one or more windings connectable to a first multi-phase inverter of the inverter circuit and a second multi-phase inverter of the inverter circuit; determining that a parameter associated with the motor is beyond a threshold value; and responsive to determining that the parameter is beyond the threshold value, operating the inverter circuit to configure the one or more windings in a Wye configuration by disconnecting the second multi-phase inverter from a node of an input voltage source.

In some aspects, the techniques described herein relate to a method, wherein operating the inverter circuit to configure the one or more windings in the Wye configuration further includes closing one or more lower switches of the second multi-phase inverter.

In some aspects, the techniques described herein relate to a method, wherein operating the inverter circuit to configure the one or more windings in the Wye configuration further includes opening one or more upper switches of the second multi-phase inverter.

In some aspects, the techniques described herein relate to a method, wherein the parameter is one or more of temperature, rotational speed, available power, or requested power.

In some aspects, the techniques described herein relate to a method, wherein operating the inverter circuit to configure the one or more windings in the Open Ended Winding configuration includes connecting the second multi-phase inverter to the node of the input voltage source.

In some aspects, the techniques described herein relate to a system including: an inverter configured to convert DC power from a voltage source to AC power to drive a motor including a plurality of windings, wherein the inverter includes: a first inverter to be connected to a first end of a first winding of the plurality of windings and a first end of a third winding of the plurality of windings; a second inverter to be connected to a first end of a second winding of the plurality of windings and a second end of the first winding of the plurality of windings; and a third inverter to be connected to a second end of the third winding of the plurality of windings and a second end of the second winding of the plurality of windings.

In some aspects, the techniques described herein relate to a system, wherein each of the first inverter, the second inverter, and the third inverter is an H-bridge inverter that includes two half-bridge inverters, and wherein each half-bridge inverter is connected to a respective winding among the first winding, the second winding, and the third winding, and connected to each other by one or more switches.

In some aspects, the techniques described herein relate to a system, wherein: the first inverter includes a first switch operable to close to connect the first end of the first winding with the first end of the third winding, the second inverter includes a second switch operable to close to connect the first end of the second winding with the second end of the first winding, and the third inverter includes a third switch operable to close to connect the second end of the third winding with the second end of the second winding.

In some aspects, the techniques described herein relate to a system, further including: a breaker switch, wherein each of the first inverter, the second inverter, and the third inverter includes a first half-bridge inverter and a second half-bridge inverter, and wherein the breaker switch includes (i) a first connection connected to a node of the voltage source and to each of the first half-bridge inverters, and (ii) a second connection connected to each of the second half-bridge inverters.

In some aspects, the techniques described herein relate to a system, wherein the breaker switch is operable to open to disconnect each of the second half-bridge inverters from the node of the voltage source to configure the plurality of windings in a Wye configuration.

In some aspects, the techniques described herein relate to a system, further including: one or more controllers configured to control the breaker switch to open or close.

In some aspects, the techniques described herein relate to a system, further including: the voltage source configured to supply the DC power to the inverter, wherein the voltage source is a battery; and the motor configured to receive the AC power from the inverter to drive the motor, wherein the system is provided as a vehicle including the inverter, the battery, and the motor.

In some aspects, the techniques described herein relate to a system including: a first inverter to be connected to a first end of a first winding of a plurality of windings of a motor and a first end of a third winding of the plurality of windings; a second inverter to be connected to a first end of a second winding of the plurality of windings and a second end of the first winding of the plurality of windings; and a third inverter to be connected to a second end of the third winding of the plurality of windings and a second end of the second winding of the plurality of windings.

In some aspects, the techniques described herein relate to a system, wherein each of the first inverter, the second inverter, and the third inverter is an H-bridge inverter that is configurable to output two or more positive voltages and two or more negative voltages.

In some aspects, the techniques described herein relate to a system, wherein each H-bridge inverter includes two half-bridge inverters, and wherein each half-bridge inverter is connected to a respective winding among the first winding, the second winding, and the third winding, and connected to each other by one or more switches.

In some aspects, the techniques described herein relate to a system, wherein: the first inverter includes a first switch operable to close to connect the first end of the first winding with the first end of the third winding, the second inverter includes a second switch operable to close to connect the first end of the second winding with the second end of the first winding, and the third inverter includes a third switch operable to close to connect the second end of the third winding with the second end of the second winding.

In some aspects, the techniques described herein relate to a system, wherein the first switch, the second switch, and the third switch are operable to close to configure the first winding, the second winding, and the third winding in a Delta configuration.

In some aspects, the techniques described herein relate to a system, further including: one or more controllers configured to control the first switch, the second switch, and the third switch to each open or close.

In some aspects, the techniques described herein relate to a system, further including: a breaker switch, wherein each of the first inverter, the second inverter, and the third inverter includes a first half-bridge inverter and a second half-bridge inverter, and wherein the breaker switch includes (i) a first connection connected to a node of a voltage source and to each of the first half-bridge inverters, and (ii) a second connection connected to each of the second half-bridge inverters.

In some aspects, the techniques described herein relate to a system, wherein the breaker switch is operable to open to disconnect each of the second half-bridge inverters from the node of the voltage source to configure the plurality of windings in a Wye configuration.

In some aspects, the techniques described herein relate to a system, further including: one or more controllers configured to control the breaker switch to open or close.

In some aspects, the techniques described herein relate to a system, further including: a bidirectional switch connected to the third inverter, wherein the bidirectional switch is operable to close to charge a battery.

In some aspects, the techniques described herein relate to a method including: operating an inverter circuit to configure a plurality of windings of a motor in an Open Ended Winding configuration, the plurality of windings connectable to a first multi-phase inverter of the inverter circuit and a second multi-phase inverter of the inverter circuit; determining that a parameter associated with the motor is beyond a threshold value; and responsive to determining that the parameter is beyond the threshold value, operating the inverter circuit to configure the plurality of windings in a Delta configuration by connecting a first end of a first winding of the plurality of windings with a first end of a third winding of the plurality of windings, a first end of a second winding of the plurality of windings with a second end of the first winding, and a second end of the third winding with a second end of the second winding.

In some aspects, the techniques described herein relate to a method, further including: operating the inverter circuit to configure the plurality of windings in a Wye configuration by disconnecting the second multi-phase inverter from a node of a voltage source.

In some aspects, the techniques described herein relate to a method, wherein the parameter is one or more of temperature, rotational speed, available power, or requested power.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
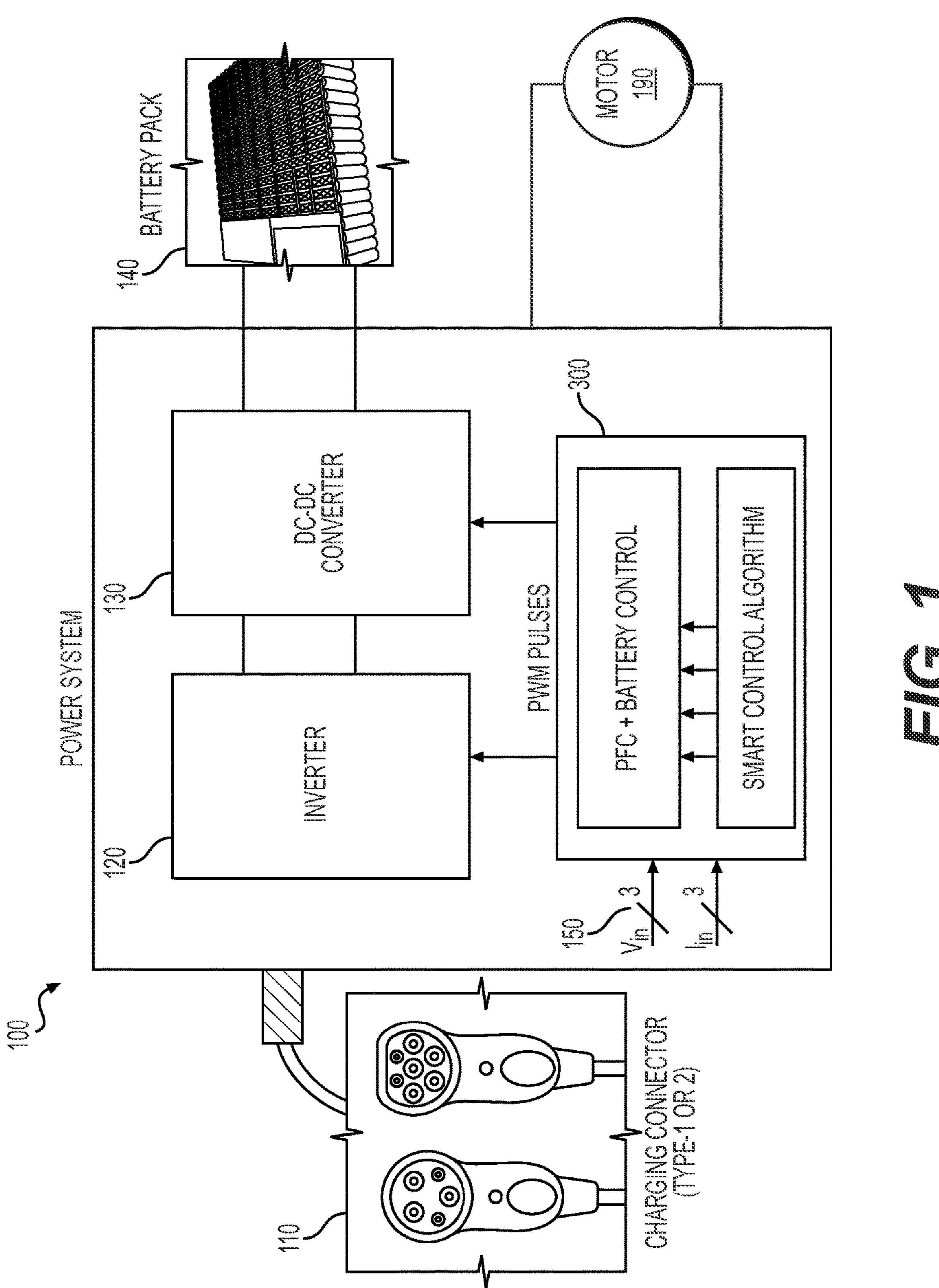
FIG. 1 depicts an exemplary system infrastructure for a power system for an electric vehicle, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Various embodiments of the present disclosure relate generally to inverters, and more particularly, but without limitation, to configurable inverters used in high voltage circuits such as motors, or e-machines, in electric vehicles. As discussed above, electrical inverters are widely used in high voltage applications, such as for driving motors of electric vehicles. Motors are wound with electrical windings which may be connected with each other and with the power source(s) in various winding configurations. Examples include Wye ("Y"), Open Ended Winding (OEW), and Delta configurations.

While a given winding configuration may have benefits such as increased efficiency or torque, a given winding configuration may not be suitable for all operations. For instance, a first winding configuration may be more efficient at a specific rotational speed, but as speeds increase, a second winding configuration may be more efficient. Accordingly, various technical advantages may be realized by dynamically reconfiguring the windings of an electric motor. Considerations may include, but are not limited to, rotational speed, torque, cost, and reliability concerns.

Disclosed solutions therefore provide advantages associated with winding configuration changes while reducing a part count of inverter circuit, thereby reducing cost. Certain aspects also employ multilevel inverters, thereby enabling a combination of multi-level voltage output with the aforementioned ability to reconfigure the circuit, thereby providing additional flexibility to the inverter system. Additional technical advantages are discussed herein.

While the examples discussed herein describe electrical inverters for use in driving electric motors and/or in battery charging circuits, the disclosure is not limited thereto. Rather, the disclosed inverters may be used in any circuit.

FIG. 1 depicts an exemplary system infrastructure for a power system for an electric vehicle, according to one or more embodiments. As explained herein, power system 100 may perform functions such as charging battery pack 140 or powering an electric vehicle via motor 190.

As depicted in FIG. 1, power system 100 may include or be electrically connectable to a charging connector 110. The charging connector 110 may provide an electrical connection from an external power supply to the power system 100, and may be a Type 1 or a Type 2 connector, for example. The charging connector 110 may transfer single phase, two-phase, or three phase power.

The power system 100 may include one or more of an inverter 120, an HV DC-DC converter 130, and a controller 300 receiving signals from input sensor 150. Inverter 120 may convert DC, for example, provided by battery pack 140, to AC in one or more phases for driving motor 190. As explained herein, various inverter configurations are possible. For instance, power system 100 may include circuits as depicted in FIG. 4, 5, 7-9, 11, or 12. As discussed, these circuits may reconfigure a connection of the windings used to energize motor 190 as needs change.

In some cases, power system 100 may include a Power Factor Correction (PFC) converter (not depicted). The PFC converter may be an AC-DC converter. HV DC-DC converter 130 may be a DC-DC converter.

Controller 300 may include one or more controllers such as processors. The power system 100 may include or be electrically connectable to a battery pack 140. The power system 100 may be used in automotive vehicles as an onboard charger to transfer power from an external power source through charging connector 110 to battery pack 140 in a grid-to-battery operation, or to transfer power from battery pack 140 in a vehicle to grid configuration (a battery-to-grid operation). The power system 100 may be included in a system provided as an electric vehicle including a motor 190 configured to rotate based on power received from the battery pack 140.

Figure 2:
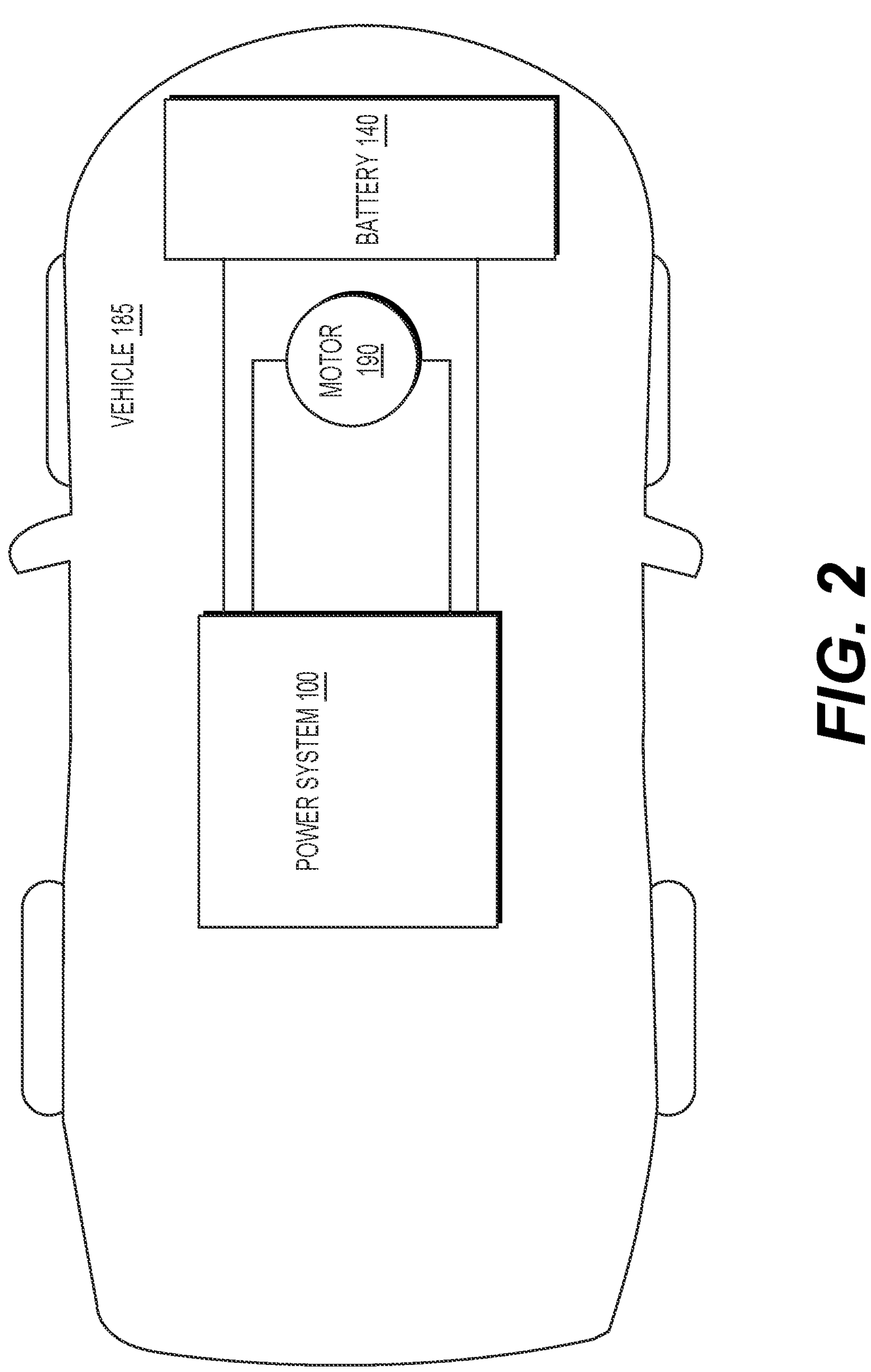
FIG. 2 depicts an exemplary system infrastructure for a vehicle including an inverter, according to one or more embodiments.

FIG. 2 depicts an exemplary system infrastructure for a vehicle including a battery charger, according to one or more embodiments. As discussed, power system 100 may include an inverter and/or a battery charger. As depicted in FIG. 2, electric vehicle 185 may include power system 100, motor 190, and battery pack 140.

Power system 100 may include components to receive electrical power from an external source and output electrical power to charge battery pack 140 of electric vehicle 185. Power system 100 may convert DC power from battery pack 140 in electric vehicle 185 to AC power, to drive motor 190 of the electric vehicle 185, for example, but the embodiments are not limited thereto. For example, power system 100 may include components to receive electrical power from an external source and output electrical power to charge battery pack 140 without motor 190 connected to power system 100. Power system 100 may convert DC power from battery pack 140 in electric vehicle 185 to AC power, to drive AC components other than motor 190 of the electric vehicle 185. Power system 100 may be bidirectional, and may convert DC power to AC power, or convert AC power to DC power, such as during regenerative braking, for example. Power system 100 may be a three-phase inverter, a single-phase inverter, or a multi-phase inverter.

Figure 3:
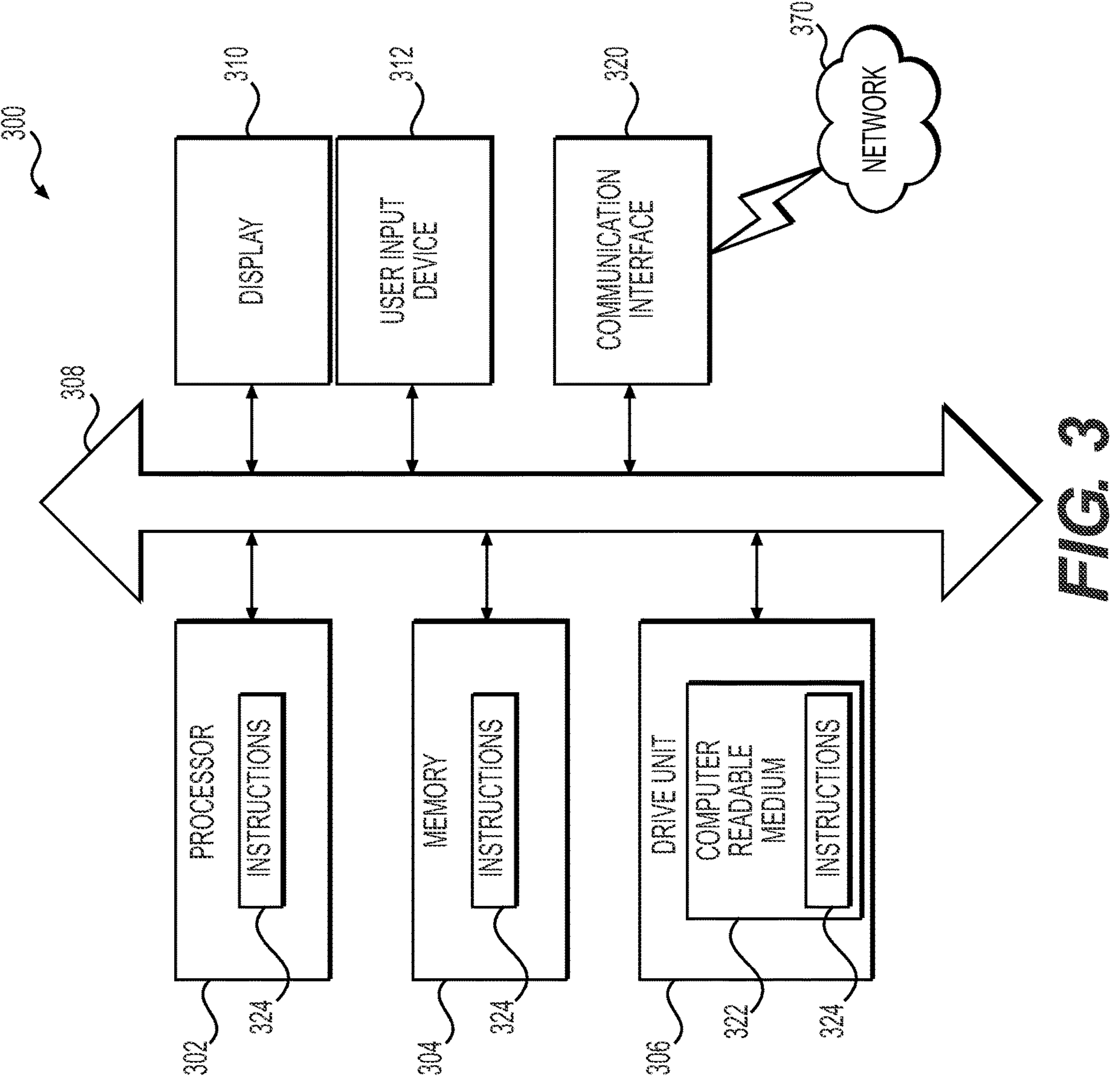
FIG. 3 depicts an implementation of a computer system that may execute techniques presented herein, according to one or more embodiments.

FIG. 3 depicts an implementation of a controller 300 that may execute techniques presented herein, according to one or more embodiments. For example, controller 300 may control one or more configurations of the circuits discussed further with respect to FIG. 4, 5, 7-9, 11, or 12. Controller may perform operations discussed with respect to methods described with respect to FIGS. 6 and 10.

Any suitable system infrastructure may be put into place to allow control of the battery charger. FIG. 3 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 3. Although not required, embodiments of the present disclosure are described in the context of computer-executable instructions, such as routines executed by a data processing device, e.g., a server computer, wireless device, and/or personal computer. Those skilled in the relevant art will appreciate that embodiments of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Embodiments of the present disclosure may be embodied in a special purpose computer and/or data processor that is specifically programmed, configured, and/or constructed to perform one or more of the computer-executable instructions explained in detail herein. While embodiments of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Embodiments of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under embodiments of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The controller 300 may include a set of instructions that may be executed to cause the controller 300 to perform any one or more of the methods or computer-based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 may be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that may communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As depicted, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, may be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 may communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 may include a solid-state memory such as a memory card or other package that houses one or more non-volatile read-only memories. The computer-readable medium 322 may be a random-access memory or other volatile re-writable memory. Additionally or alternatively, the computer-readable medium 322 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, may be constructed to implement one or more of the methods described herein. Applications that may include the apparatus and systems of various implementations may broadly include a variety of electronic and computer systems. One or more implementations described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations may include distributed processing, component/object distributed processing, and parallel processing. Alternatively, virtual computer system processing may be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
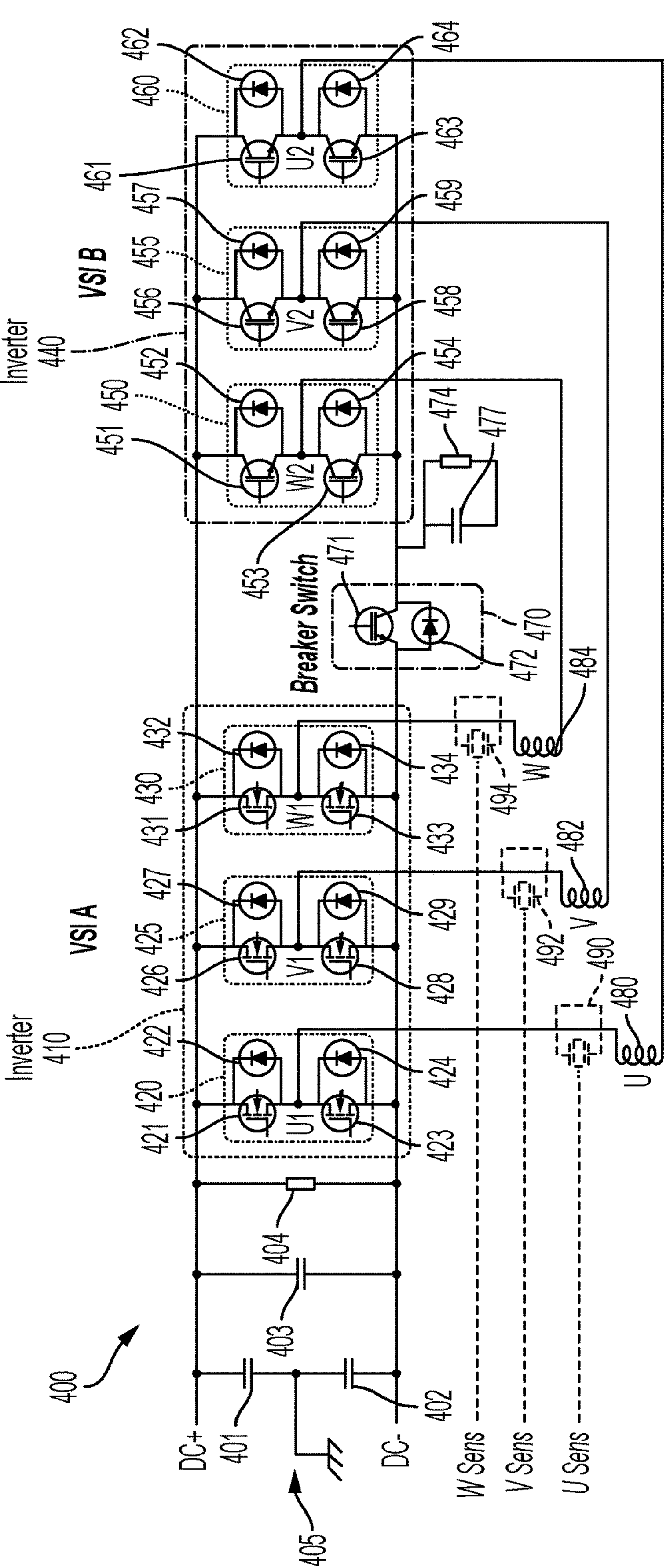
FIG. 4 depicts an exemplary electrical schematic for an inverter in a system configurable in an Open Ended Winding (OEW) or a Wye winding configuration, according to one or more embodiments.

FIG. 4 depicts an exemplary electrical schematic for an inverter in a system configurable in an Open Ended Winding (OEW) or a Wye winding configuration, according to one or more embodiments. In the example depicted, circuit 400 generates and applies various alternating voltages across windings of a motor. As discussed further herein, a configuration of the windings may be changed from an OEW configuration to a Wye ("Y") configuration and vice versa. Additional configurations are possible.

Circuit 400 may include capacitor 401, capacitor 402, capacitor 403, resistor 404, and ground 405. Capacitors 401, 402, and 403 may perform different functions including filtering and smoothing out a DC input voltage provided to circuit 400.

Circuit 400 may include multi-phase inverters (Voltage Source Inverters) 410 and 440. Each multi-phase inverter 410 and 440 may be configurable to generate and output one or more positive or negative voltages and apply the generated voltages across windings 480 ("U winding"), 482 ("V winding"), and 484 ("W winding"). While a three-phase configuration is discussed for illustrative purposes, any number of phases are possible.

Each multi-phase inverter 410 and 440 may include three half-bridge inverters or legs, each for a corresponding phase. Multi-phase inverter 410 may include three half-bridge inverters 420, 425, and 430. Each half-bridge inverter 420, 425, and 430 corresponds to a respective phase, U1, V1, and W1, respectively. Multi-phase inverter 440 includes three half-bridge inverters 450, 455, and 460. Each of half-bridge inverters 450, 455, and 460 corresponds to a respective phase, W2, V2, and U2, respectively.

As depicted, each of the half-bridge inverters in multi-phase inverter 410 is connected across a respective winding to a corresponding half-bridge inverter in multi-phase inverter 440. For example, half-bridge inverter 420 connects via winding 480 ("U winding") to half-bridge inverter 460. Half-bridge inverter 425 connects via winding 482 ("V winding") to half-bridge inverter 455. Half-bridge inverter 430 connects via winding 484 ("W winding") to half-bridge inverter 450.

Half-bridge inverter 420 may include switch 421 and diode 422 (collectively forming an upper switch), and switch 423 and diode 424 (collectively forming a lower switch). Half-bridge inverter 425 may include switch 426 and diode 427 (collectively forming an upper switch), and switch 428 and diode 429 (collectively forming a lower switch). Half-bridge inverter 430 includes switch 431 and diode 432 (collectively forming an upper switch), and switch 433 and diode 434 (collectively forming a lower switch). The switches may be any suitable technology such as magnetic switches, relays, transistors (e.g., silicon, silicon carbide, or gallium nitride), and so forth.

Half-bridge inverter 450 may include switch 451 and diode 452 (collectively forming an upper switch), and switch 453 and diode 454 (collectively forming a lower switch). Half-bridge inverter 455 includes switch 456 and diode 457 (collectively forming an upper switch), and switch 458 and diode 459 (collectively forming a lower switch). Half-bridge inverter 460 includes switch 461 and diode 462 (collectively forming an upper switch), and switch 463 and diode 464 (collectively forming a lower switch).

Each half-bridge inverter 420, 425, and 430 of multi-phase inverter 410 and half-bridge inverter 450, 455, and 460 of multi-phase inverter 440 may be connected to a first node of a voltage source, such as a positive DC source rail. Each half-bridge inverter 420, 425, and 430 of multi-phase inverter 410 may be connected to a second node of a voltage source, such as a negative DC source rail.

Circuit 400 may further include breaker switch 470, which may be used to change the winding configuration of circuit 400. Breaker switch 470 serves to connect half-bridge inverter 450, 455, and 460 of multi-phase inverter 440 to the negative DC rail or to disconnect half-bridge inverter 450, 455, and 460 of multi-phase inverter 440 from the negative DC rail. As further discussed, breaker switch 470, in conjunction with the lower switches of inverter 440, may operate to configure circuit 400 in an open-ended winding (OEW) configuration or in a Wye ("Y") configuration.

For instance, as depicted, breaker switch 470 includes switch 471 and diode 472, enabling the connection and disconnection of the half-bridge inverters 450, 455, and 460 of multi-phase inverter 440 to and from the negative DC source rail. In some cases, a charge capacitor-resistor combination, as depicted by capacitor 477 and resistor 474, is placed to assist in operation of the breaker switch 470.

Breaker switch 470, specifically switch 471, may be configured in an open or a closed position. Breaker switch 470 may be a unidirectional switch or a bidirectional switch that blocks voltage and current in both directions. When breaker switch 470, specifically, switch 471, is closed, then the circuit 400 is configured in the OEW configuration. In the OEW configuration, multi-phase inverters 410 and 440 operate as multi-phase inverters such that each end of each winding is connected to a respective half-bridge inverter. As discussed further herein, an operation of breaker switch 470 may be controlled by a controller.

Certain technical advantages may be realized via winding changes. For instance, an OEW configuration allows a motor to output increased amounts of torque at certain rotational speeds. Relative to other configurations, in an OEW configuration, an increased voltage, specifically the full DC voltage may be provided to a single winding.

Circuit 400 may also be configured in a Wye ("Y") configuration. For example, breaker switch 470 may be set in an open position. Further, the lower switches of each of the half-bridge inverters in multi-phase inverter 440, e.g., switches 453, 458, and 463 may be closed and the upper switches, e.g., switches 451, 456, and 461 of multi-phase inverter 440 are set to open.

In the Wye configuration, the three lower devices of the multi-phase inverter 440 are used as the neutral-point clamping (NPC) switches. The upper switches, e.g., switches 451, 456, and 461, may be reverse-blocking (or bidirectional) switches. This configuration essentially disables operation of multi-phase inverter 440, and leaves inverter functionality to multi-phase inverter 410. In this case, connection points W2, V2, and U2 are connected to each other, forming an artificial neutral point. Such a configuration is further depicted in FIG. 5.

Circuit 400 may also include sensing coils 490, 492, and 494. Sensing coils 490, 492, and 494 are placed adjacent to windings 480, 482, and 484 respectively. Sensing coils 490, 492, and 494 enable measurements of currents to be made.

Figure 5:
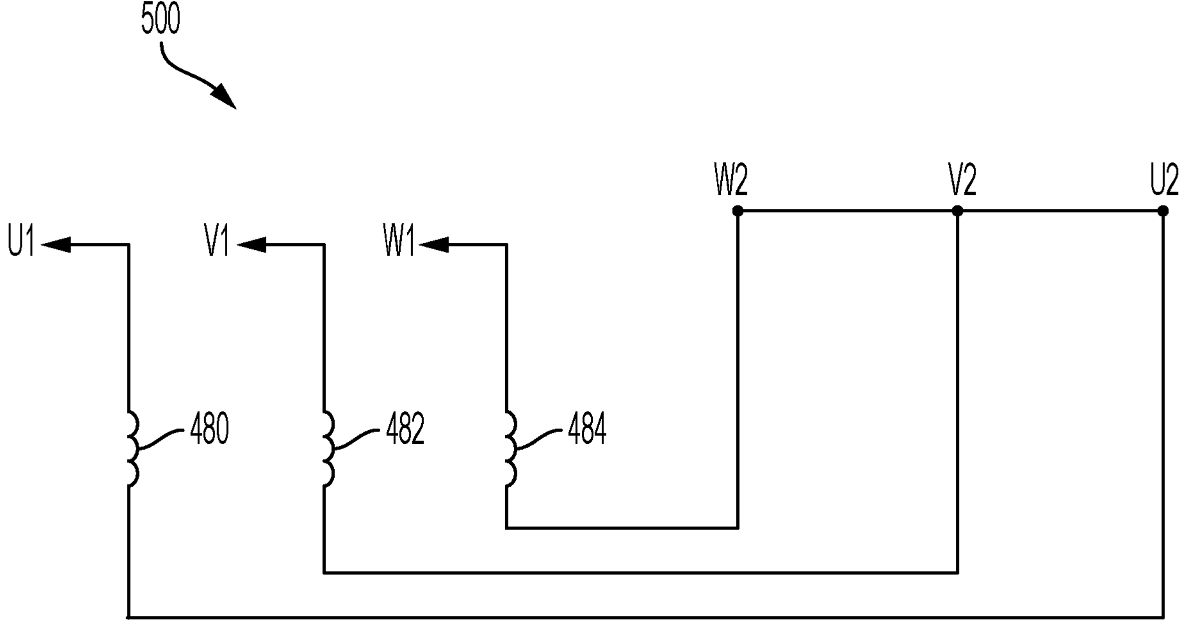
FIG. 5 depicts an exemplary electrical schematic for motor windings configured in a Wye winding configuration, according to one or more embodiments.

FIG. 5 depicts an exemplary electrical schematic for motor windings configured in a Wye winding configuration, according to one or more embodiments. Circuit 500 depicts windings 480, 482, and 484. Winding 480 is connected from U1 to a common neutral rail U2/V2/W2. Winding 482 is connected from V1 to the common neutral rail U2/V2/W2. Winding 484 is connected from W1 to the common neutral rail U2/V2/W2.

The common neutral rail, not typically available in some Wye configurations, may be used for troubleshooting. For instance, in the event of a device or component failure, the neutral rail may permit the discharging of various components, e.g., capacitors, via the neutral rail to a ground connection.

Figure 6:
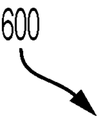
FIG. 6 depicts an exemplary method for operating an inverter, according to one or more embodiments.
Figure 6:
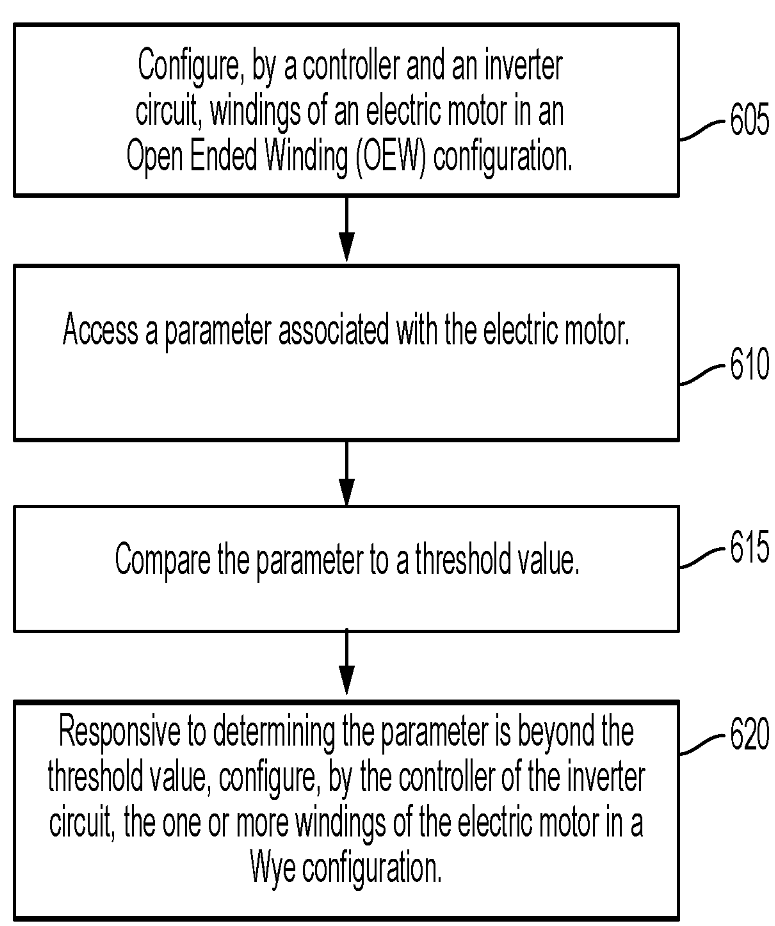

FIG. 6 depicts an exemplary method for operating an inverter, according to one or more embodiments. For illustrative purposes, method 600 is discussed with respect to the controller as depicted in FIG. 3 and circuit 400 depicted in FIG. 4. However, method 600 may be applied to other circuits as appropriate, such as those discussed with respect to FIGS. 9, 11, and 12. Further, while method 600 depicts various operations, not all the operations listed may be performed and/or some operations may be repeated as appropriate.

At block 605, method 600 may involve configuring, by a controller and a circuit, windings of an electric motor in an Open Ended Winding (OEW) configuration. For example, controller 300 configures breaker switch 470 to be closed and causes inverter 440 to be connected to the DC− voltage source. In this case, each of multi-phase inverters 410 and 440 operate as inverters and provide one or more modulated voltages across windings 480, 482, and 484.

At block 610, method 600 may involve accessing a parameter associated with the electric motor. Examples of parameters include DC voltage, rotational speed, torque, vehicle speed, temperature, remaining battery capacity, available power, and driver requested power.

At block 615, method 600 may involve comparing the parameter to a threshold value. For example, if the parameter is battery capacity, then a suitable threshold may be ten percent of battery charge. In another example, if the parameter is temperature, then the threshold may be a measurement in degrees Celsius or Fahrenheit.

At block 620, method 600 may involve, responsive to determining the parameter is beyond the threshold value, configuring, by the controller of the circuit, the one or more windings of the electric motor in a Wye configuration. In so doing, controller 300 may cause the lower switches of the inverter 440 to be closed. Controller 300 may also cause the upper switches of the inverter 440 to be open.

In this manner, the motor windings may be configured to operate in a more power efficient mode when the capacity is beyond (e.g., below) the threshold. In this example, if a temperature threshold is exceeded, then the controller 300 may configure the windings of the motor to be in a more efficient configuration.

It will be appreciated that a circuit may be configured to transition from Wye configuration, e.g., as discussed at block 620, back to OEW configuration, e.g., as discussed at block 605.

Figure 7:
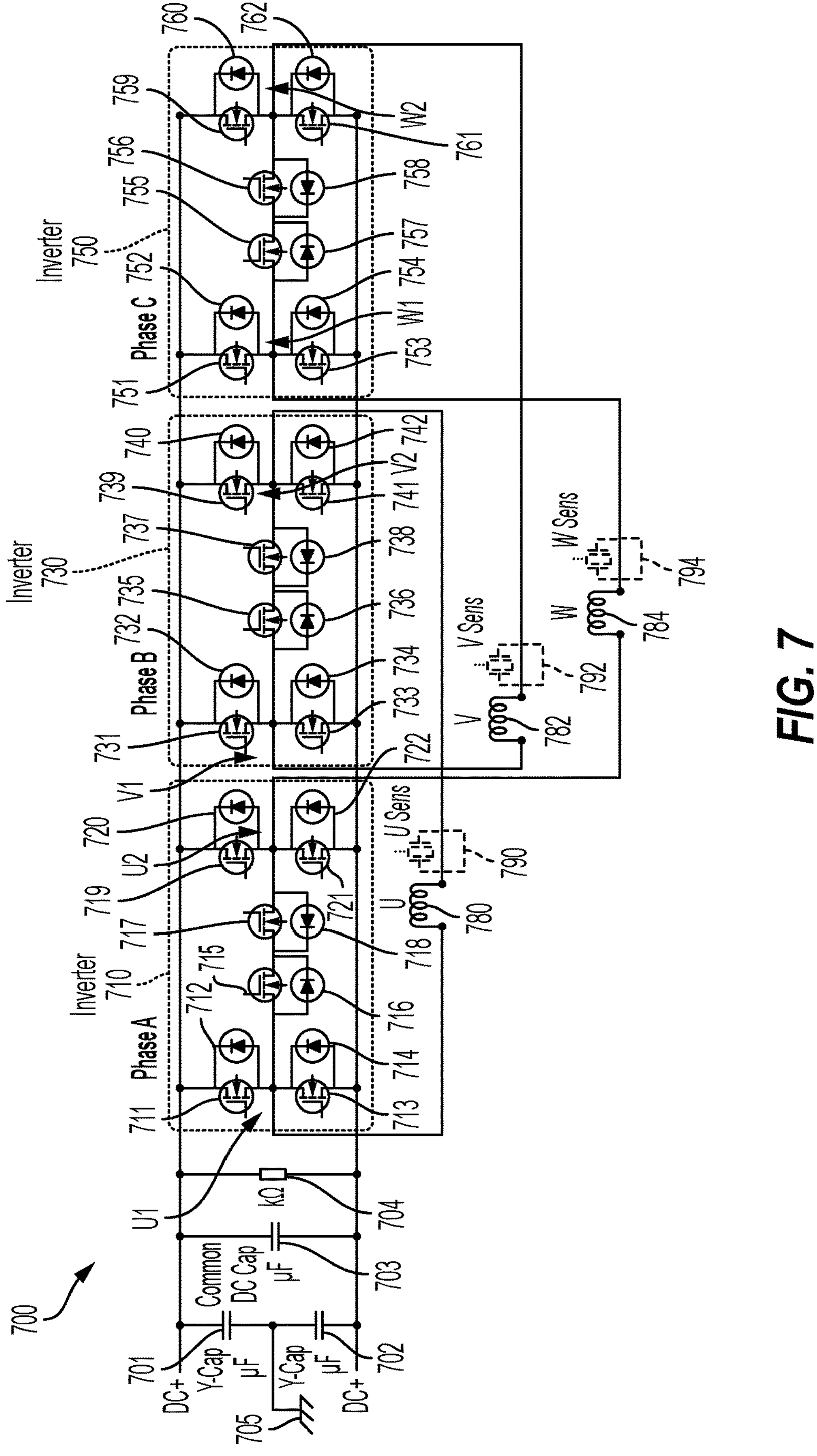
FIG. 7 depicts an exemplary electrical schematic for a multi-level inverter in a system configurable in an Open Ended Winding (OEW) or a Delta winding configuration, according to one or more embodiments.

FIG. 7 depicts an exemplary electrical schematic for a multi-level inverter in a system configurable in an Open Ended Winding (OEW) or a Delta winding configuration, according to one or more embodiments. In the example depicted, circuit 700 generates and applies various alternating voltages across windings of a three-phase motor. Additionally or alternatively, a configuration of the windings may be changed from an OEW configuration to a Delta configuration and vice versa.

Circuit 700 includes capacitor 701, capacitor 702, capacitor 703, resistor 704, and ground 705. Capacitors 701, 702, and 703 may perform different functions including filtering and smoothing out a DC input voltage provided to circuit 700.

Circuit 700 includes multi-level inverters that may create various different voltage levels. Circuit 700 may include H-bridge inverters 710, 730, and 750. H-bridge inverters 710, 730, and 750, which are multi-level inverters, may create various voltages and apply those voltages across windings 780, 782, and 784. For example, each of H-bridge inverters 710, 730, and 750 may output two positive voltages such as +DC (e.g., positive rail) and ½+DC, and/or a negative voltage such as −DC (e.g., negative rail). H-bridge inverters 710, 730, and 750 may output other voltages, such as three positive voltages including ⅓+DC, ⅔+DC, and +DC (e.g., positive rail) voltages, for example. Other examples are possible.

Each H-bridge inverter 710, 730, and 750 is connected to an end of two phase windings 780, 782, and 784. For example, H-bridge inverter 710 is connected to a first end of winding 780 and to a first end of winding 784. H-bridge inverter 730 is connected to a first end of winding 782 and to a second end of winding 780. H-bridge inverter 750 is connected to a second end of winding 784 and to a second end of winding 782. Other configurations are possible.

Each H-bridge inverter has six switches. H-bridge inverter 710 may include switches 711, 713, 715, 717, 719, and 721. H-bridge inverter 710 may include diodes 712, 714, 716, 718, 720, and 722. H-bridge inverter 730 may include switches 731, 733, 735, 737, 739, and 741. H-bridge inverter 730 may include diodes 732, 734, 736, 738, 740, and 742. H-bridge inverter 750 may include switches 751, 753, 755, 756, 759, and 761. H-bridge inverter 750 may include diodes 752, 754, 757, 758, 760, and 762. The switches may be any suitable technology such as magnetic switches, relays, transistors (e.g., silicon, silicon carbide, or gallium nitride), and so forth.

As can be seen, each H-bridge inverter includes two half-bridge inverters connected by one or more switches. Each switch may be opened or closed. For example, switches 715 and 717 of inverter 710, switches 735 and 737 of inverter 730, and switches 755 and 756 of inverter 750 may each be opened or closed. The switches may be implemented as two unidirectional switches, which are connected in either a common-source or common-drain connection, or as a bidirectional switch, or as an integrated switch (power module).

Figure 8:
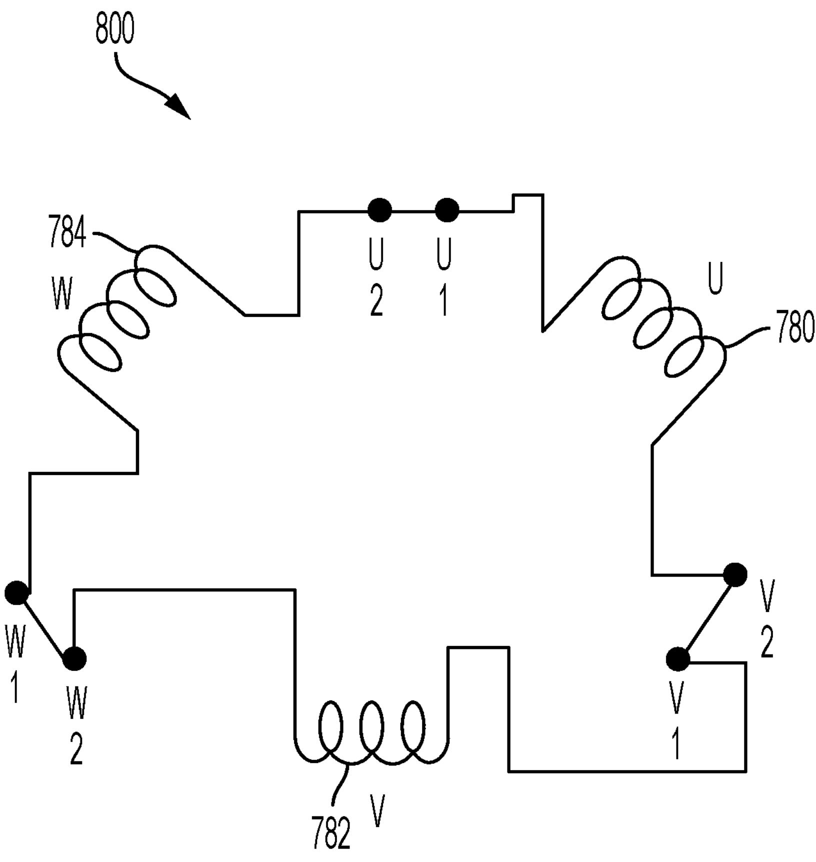
FIG. 8 depicts an exemplary electrical schematic for motor windings configured in a Delta winding configuration, according to one or more embodiments.

These switches are used to configure circuit 700 in a Delta configuration, as depicted further in FIG. 8. More specifically, when switches 715 and 717 are closed, the winding points U1, U2 are connected. Similarly, when switches 735 and 737 are connected, winding points V1 and V2 are connected. When switches 755 and 756 are closed, the winding points W1 and W2 are connected.

Any of the switches of circuit 700 may be operated by one or more controllers such as controller 300. In this manner, circuit 700 may be configured or reconfigured remotely. Examples of methods for controlling configurations of circuits are discussed further with respect to FIGS. 6 and 10.

Circuit 700 may also include sensing coils 790, 792, and 794. Sensing coils 790, 792, and 794 are placed adjacent to windings 780, 782, and 784 respectively. Sensing coils 790, 792, and 794 enable measurements of currents to be made.

FIG. 8 depicts an exemplary electrical schematic for motor windings configured in a Delta winding configuration, according to one or more embodiments. Motor windings 800 are configured in the Delta configuration, as discussed above with respect to FIG. 7, when the switches 715 and 717 of inverter 710, switches 735 and 737 of inverter 730, and switches 755 and 756 of inverter 750 are all closed.

As depicted, the U, V, and W windings are all connected to each other. For example, the U winding 780 is connected to the V winding 782 on one end and the W winding 784 on the other end and so forth.

Figure 9:
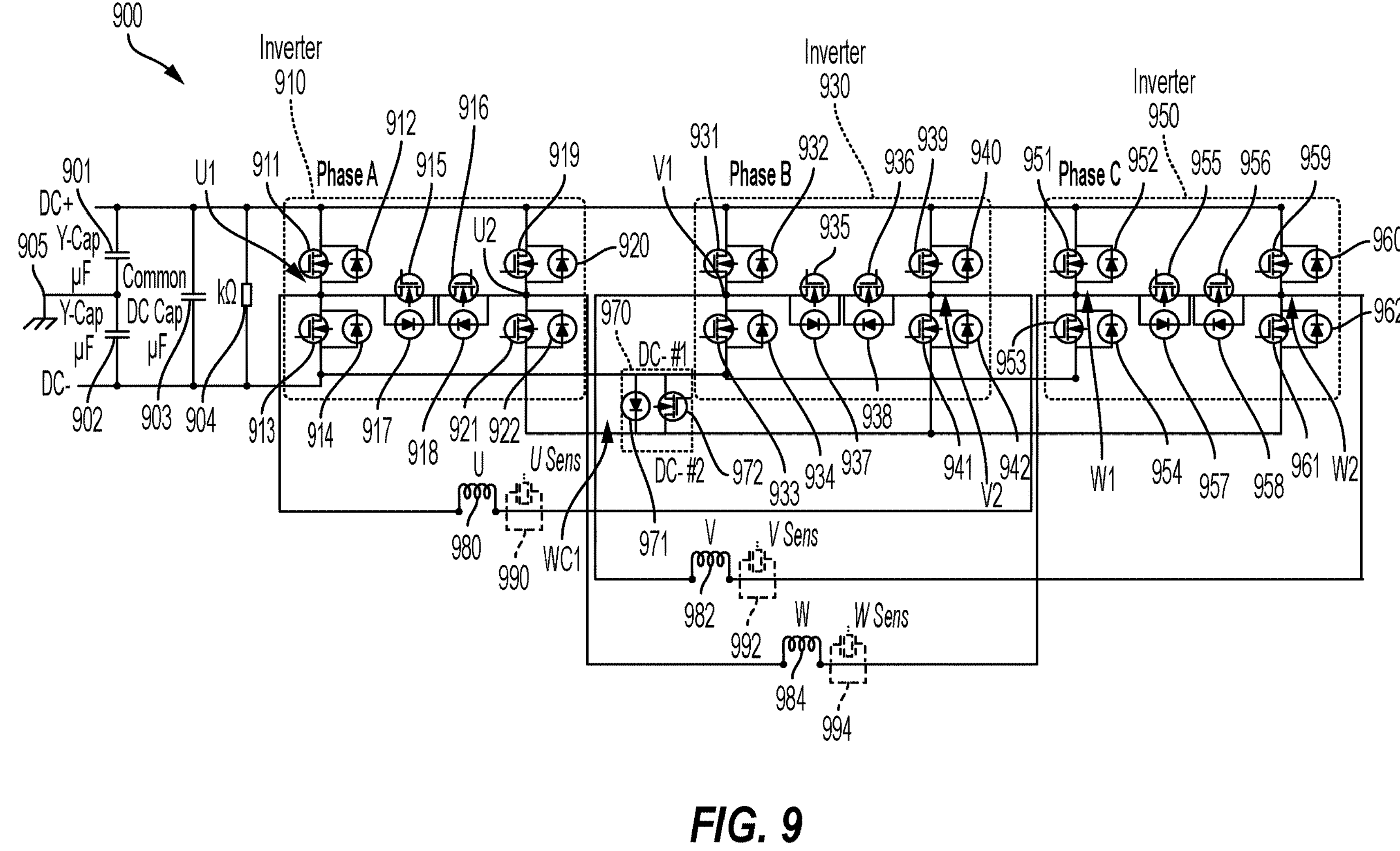
FIG. 9 depicts an exemplary electrical schematic for a multi-level inverter in a system configurable in an Open Ended Winding (OEW) or a Wye winding configuration, according to one or more embodiments.

FIG. 9 depicts an exemplary electrical schematic for a multi-level inverter in a system configurable in an Open Ended Winding (OEW) or a Wye winding configuration, according to one or more embodiments. In the example depicted, circuit 900 generates and applies various alternating voltages across windings of a three-phase motor. In addition to the OEW and Delta configurations possible in circuit 700, circuit 900 adds a breaker switch 970, which further enables the Wye configuration. Breaker switch 970 may operate in a similar manner as breaker switch 470 discussed with respect to FIG. 4. Breaker switch 970 may be a bidirectional switch.

Circuit 900 includes capacitor 901, capacitor 902, capacitor 903, resistor 904, and ground 905. Capacitors 901, 902, and 903 may perform different functions including smoothing out a DC input voltage provided to circuit 900.

Circuit 900 includes multi-level inverters that may create various different voltage levels. Circuit 900 may include H-bridge inverters 910, 930, and 950. H-bridge inverters 910, 930, and 950, which are multi-level inverters, may create various voltages and apply those voltages across windings 980, 982, and 984. For example, each of H-bridge inverters 910, 930, and 950 may output two positive voltages such as +DC (e.g., positive rail) and ½+DC, and/or a negative voltage such as −DC (e.g., negative rail). Other examples are possible.

Each H-bridge inverter 910, 930, and 950 is connected to an end of two phase windings 980, 982, and 984. For example, H-bridge inverter 910 is connected to a first end of winding 980 and to a first end of winding 984. H-bridge inverter 930 is connected to a first end of winding 982 and to a second end of winding 980. H-bridge inverter 950 is connected to a second end of winding 984 and to a second end of winding 982. Other configurations are possible.

Each H-bridge inverter has six switches. H-bridge inverter 910 may include switches 911, 913, 915, 916, 919, and 921. H-bridge inverter 910 may include diodes 912, 914, 917, 918, 920, and 922. H-bridge inverter 930 may include switches 931, 933, 935, 936, 939, and 941. H-bridge inverter 930 may include diodes 932, 934, 937, 938, 940, and 942.

H-bridge inverter 950 may include switches 951, 953, 955, 956, 959, and 961. H-bridge inverter 950 may include diodes 952, 954, 957, 958, 960, and 962. The switches may be any suitable technology such as magnetic switches, relays, transistors (e.g., silicon, silicon carbide, or gallium nitride), and so forth.

As can be seen, each H-bridge inverter includes two half-bridge inverters connected by one or more switches. Each switch may be opened or closed. For example, switches 915 and 916 of inverter 910, switches 935 and 936 of inverter 930, and switches 955 and 956 of inverter 950 may each be opened or closed. The switches may be implemented as two unidirectional switches, which are connected in either a common-source or common-drain connection, or as a bidirectional switch, or as an integrated switch (power module).

These switches are used to configure circuit 900 in a Delta configuration, as depicted in FIG. 8. More specifically, when switches 915 and 916 are closed, the winding points U1, U2 are connected. Similarly, when switches 935 and 936 are connected, winding points V1 and V2 are connected. When switches 955 and 956 are closed, the winding points W1 and W2 are connected.

Any of the switches of circuit 900 may be operated by one or more controllers such as controller 300. In this manner, circuit 900 may be configured or reconfigured remotely. Examples of methods for controlling configurations of circuits are discussed further with respect to FIGS. 6 and 10.

Circuit 900 may also include sensing coils 990, 992, and 994. Sensing coils 990, 992, and 994 are placed adjacent to windings 980, 982, and 984 respectively. Sensing coils 990, 992, and 994 enable measurements of currents to be made.

Circuit 900 may further include breaker switch 970, which may be used to further adjust the winding configuration of circuit 900. As depicted, each of inverter 910, 930, and 950 includes a left-most half bridge inverter and a right-most half bridge inverter.

As can be seen, the U1, V1, and W1 left-most half bridge inverters are connected to each other and to the negative DC rail. The U2, V2, and W2 right-most half bridge inverters are connected to each other, but connected to (or disconnected from) the negative DC rail via breaker switch 970. Accordingly, breaker switch 970 serves to connect and disconnect the right-most half-bridge inverters in each of inverter 910, 930, and 950 to and from the negative DC rail.

Breaker switch 970, specifically switch 971, may be configured in an open or a closed position. When breaker switch 970 is closed, then circuit 900 is configured in the OEW configuration. When breaker switch 970 is open, and in conjunction with an operation of the lower switches of the right-most half-bridge inverters in each of inverter 910, 930, and 950, then circuit 900 is configured in the Wye ("Y") configuration.

For instance, as depicted, breaker switch 970 includes switch 971 and diode 972, enabling the connection and disconnection of the right-most half-bridge inverters of inverters 910, 930, and 950 of circuit 900 from the negative DC source rail. As discussed further herein, an operation of breaker switch 970 may be controlled by a controller.

Further, multi-level inverter outputs may be utilized in conjunction with winding configuration changes. For instance, the H-Bridge inverters may output a two-level or three-level set of voltages in combination with OEW, Wye, or Delta winding configurations, thereby realizing additional technical advantages via complex control and modulation techniques and winding configurations.

Figure 10:
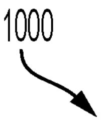
FIG. 10 depicts an exemplary method for operating an inverter, according to one or more embodiments.
Figure 10:
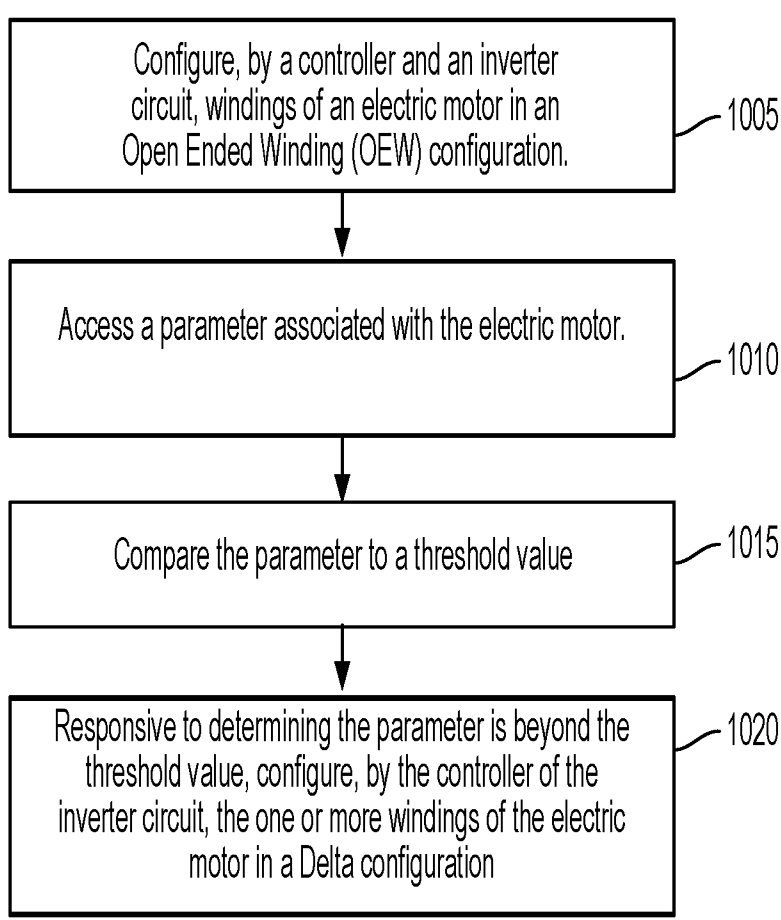

FIG. 10 depicts an exemplary method for operating an inverter, according to one or more embodiments. For illustrative purposes, method 1000 is discussed with respect to the controller as depicted in FIG. 3, circuit 700 depicted in FIG. 7, and circuit 900 depicted in FIG. 9. However, method 1000 may be applied to other circuits as appropriate. While method 1000 depicts various operations, not all the operations listed may be performed and/or some operations may be repeated as appropriate.

At block 1005, method 1000 may involve configuring, by a controller and a circuit, windings of an electric motor in an Open Ended Winding (OEW) configuration. For example, considering circuit 700, controller 300 configures switches 715 and 717, 735 and 737, and 755 and 756 to be open, disconnecting U1 from U2, V1 from V2, and W1 from W2. Additionally, considering circuit 900, controller 300 configures breaker switch 970 to be closed, thereby connecting the right-most half-bridge inverters in each of inverter 910, 930, and 950 to the negative DC rail.

At block 1010, method 1000 may involve accessing a parameter associated with the electric motor. Examples of parameters include rotational speed, torque, vehicle speed, temperature, remaining battery capacity, available power, and driver requested power.

At block 1015, method 1000 may involve comparing the parameter to a threshold value. For example, if the parameter is battery capacity, then a suitable threshold may be ten percent of battery charge. In another example, if the parameter is temperature, then the threshold may be a measurement in degrees Celsius or Fahrenheit.

At block 1020, method 1000 may involve responsive to determining the parameter is beyond the threshold value, configuring, by the controller of the circuit, the one or more windings of the electric motor in a Delta configuration. With respect to circuit 700, controller 300 closes switches 715 and 717, thereby connecting winding points U1 and U2, switches 735 and 737, thereby connecting winding points V1 and V2, and switches 755 and 756, thereby connecting winding points W1 and W2.

With respect to circuit 900, the controller 300 closes breaker switch 970, thereby connecting the right-most half-bridge inverters in each of inverter 910, 930, and 950 to the negative DC rail, such that circuit 900 mirrors that of circuit 700. In some aspects, method 1000 may continue, reconfiguring the circuit in additional configurations. Method 1000 may include operations to support LC resonant topologies, for example, to aid in switching operations of inverter 910, 930, and 950.

Figure 11:
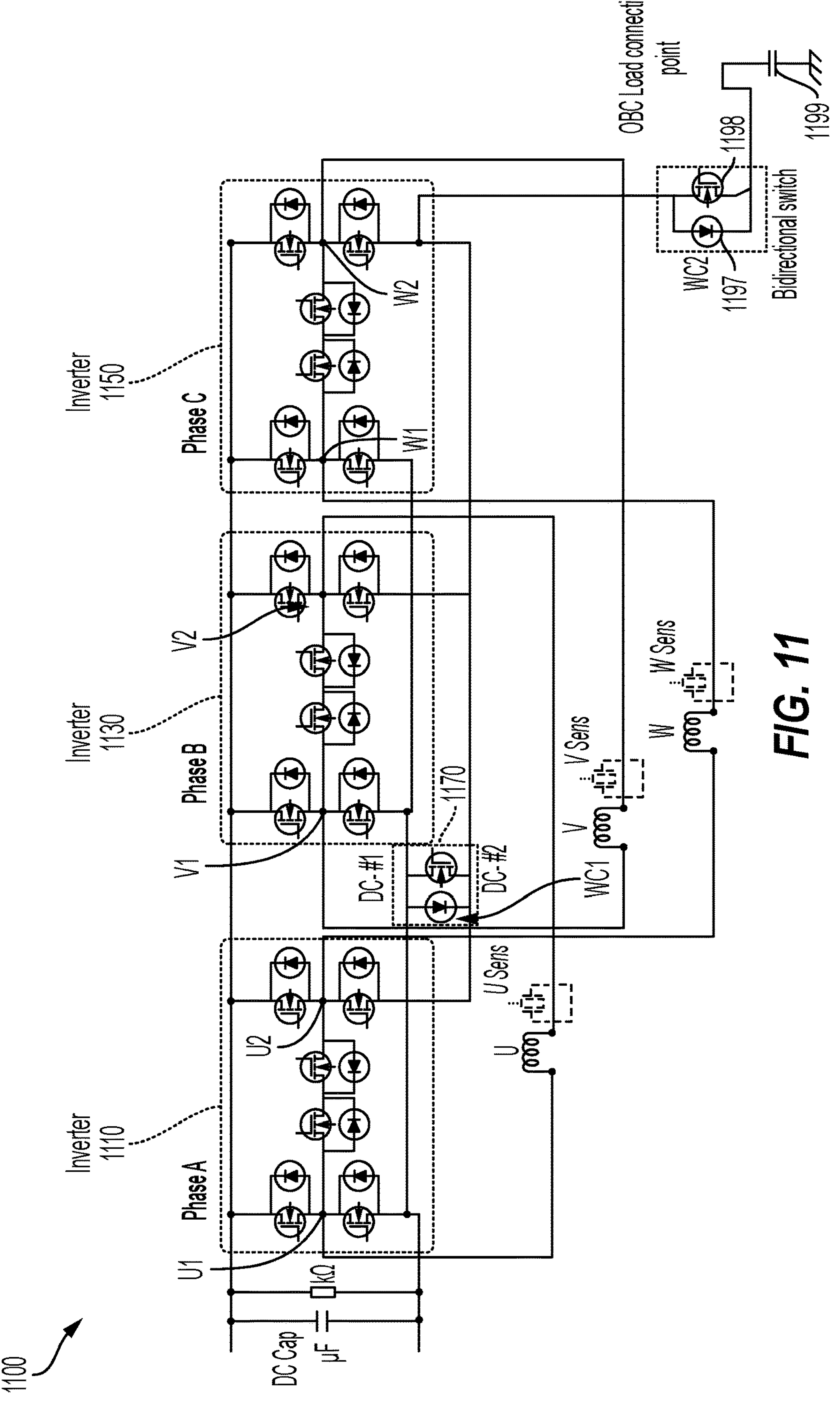
FIG. 11 depicts an exemplary electrical schematic for a system including a multi-level inverter and a battery, according to one or more embodiments.

FIG. 11 depicts an exemplary electrical schematic for a system including a multi-level inverter and a battery, according to one or more embodiments. Circuit 1100 represents an on-board charging aspect, as discussed with respect to FIGS. 1 and 2. Such an implementation leverages the inductive and/or capacitive properties of the windings and/or magnets in an electric motor to eliminate a need for an inductor and/or capacitor in the charging circuit.

Circuit 1100 includes inverters 1110, 1130, and 1150 corresponding to phases A, B, and C, and winding connections U, V, and W, respectively, and breaker switch 1170. Relative to circuit 900, circuit 1100 includes a connection point for a battery from the right-side half bridge of inverter 1150. Circuit 1100 further includes bidirectional switch 1198, diode 1197, and capacitor 1199. Diode 1197 may be omitted, depending on a type of bidirectional switch 1198.

Figure 12:
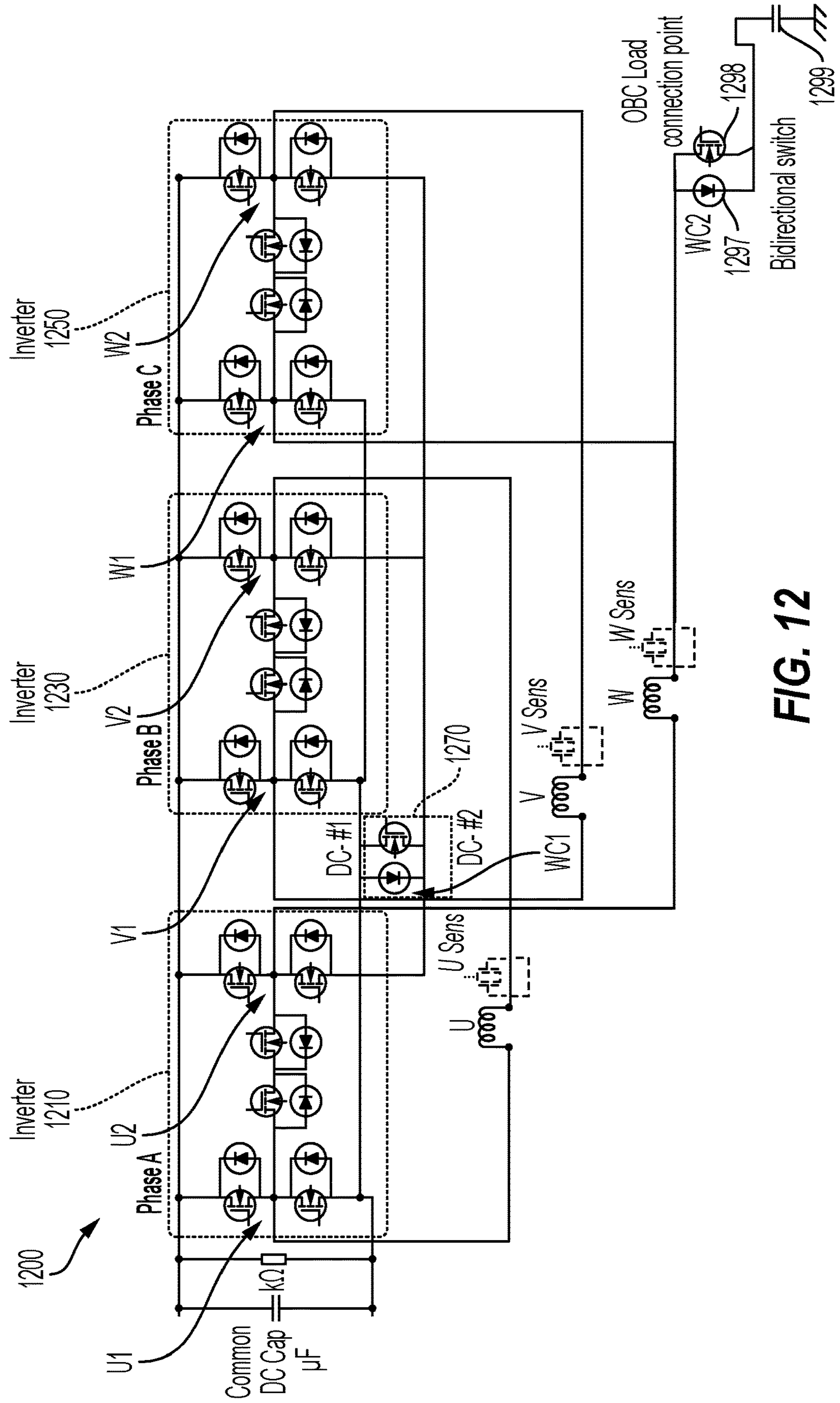
FIG. 12 depicts an exemplary electrical schematic for a system including a multi-level inverter and a battery, according to one or more embodiments.

FIG. 12 depicts an exemplary electrical schematic for a system including a multi-level inverter and a battery, according to one or more embodiments. Circuit 1200 represents an on-board charging aspect, as discussed with respect to FIGS. 1 and 2. As with circuit 1100, circuit 1200 leverages the inductive and/or capacitive properties of the windings and/or magnets in an electric motor to eliminate a need for an inductor and/or capacitor in the charging circuit.

Circuit 1200 includes inverters 1210, 1230, and 1250 corresponding to phases A, B, and C, and winding connections U, V, and W, respectively, and breaker switch 1270. Relative to circuit 900, circuit 1200 includes a connection point for a battery from the left-side half bridge of inverter 1250. Circuit 1200 further includes bidirectional switch 1298, diode 1297, and capacitor 1299.

One or more embodiments may provide advantages associated with winding configuration changes while reducing a part count of inverter circuit, thereby reducing cost. Certain aspects also employ multilevel inverters, thereby enabling a combination of multi-level voltage output with the aforementioned ability to reconfigure the circuit, thereby providing additional flexibility to the inverter system.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:

an inverter configured to convert DC power from a voltage source to AC power to drive a motor including a plurality of windings, wherein the inverter includes:

a first inverter to be connected to a first end of a first winding of the plurality of windings and a first end of a third winding of the plurality of windings;

a second inverter to be connected to a first end of a second winding of the plurality of windings and a second end of the first winding of the plurality of windings; and a third inverter to be connected to a second end of the third winding of the plurality of windings and a second end of the second winding of the plurality of windings.

2. The system of claim 1, wherein each of the first inverter, the second inverter, and the third inverter is an H-bridge inverter that includes two half-bridge inverters, and wherein each half-bridge inverter is connected to a respective winding among the first winding, the second winding, and the third winding, and connected to each other by one or more switches.

3. The system of claim 1, wherein:

the first inverter includes a first switch operable to close to connect the first end of the first winding with the first end of the third winding, the second inverter includes a second switch operable to close to connect the first end of the second winding with the second end of the first winding, and the third inverter includes a third switch operable to close to connect the second end of the third winding with the second end of the second winding.

4. The system of claim 1, further comprising:

a breaker switch, wherein each of the first inverter, the second inverter, and the third inverter includes a first half-bridge inverter and a second half-bridge inverter, and wherein the breaker switch includes (i) a first connection connected to a node of the voltage source and to each of the first half-bridge inverters, and (ii) a second connection connected to each of the second half-bridge inverters.

5. The system of claim 4, wherein the breaker switch is operable to open to disconnect each of the second half-bridge inverters from the node of the voltage source to configure the plurality of windings in a Wye configuration.

6. The system of claim 4, further comprising:

one or more controllers configured to control the breaker switch to open or close.

7. The system of claim 1, further comprising:

the voltage source configured to supply the DC power to the inverter, wherein the voltage source is a battery; and the motor configured to receive the AC power from the inverter to drive the motor, wherein the system is provided as a vehicle including the inverter, the battery, and the motor.

8. A system comprising:

a first inverter to be connected to a first end of a first winding of a plurality of windings of a motor and a first end of a third winding of the plurality of windings;

a second inverter to be connected to a first end of a second winding of the plurality of windings and a second end of the first winding of the plurality of windings; and a third inverter to be connected to a second end of the third winding of the plurality of windings and a second end of the second winding of the plurality of windings.

9. The system of claim 8, wherein each of the first inverter, the second inverter, and the third inverter is an H-bridge inverter that is configurable to output two or more positive voltages and two or more negative voltages.

10. The system of claim 9, wherein each H-bridge inverter includes two half-bridge inverters, and wherein each half-bridge inverter is connected to a respective winding among the first winding, the second winding, and the third winding, and connected to each other by one or more switches.

11. The system of claim 8, wherein:

the first inverter includes a first switch operable to close to connect the first end of the first winding with the first end of the third winding, the second inverter includes a second switch operable to close to connect the first end of the second winding with the second end of the first winding, and the third inverter includes a third switch operable to close to connect the second end of the third winding with the second end of the second winding.

12. The system of claim 11, wherein the first switch, the second switch, and the third switch are operable to close to configure the first winding, the second winding, and the third winding in a Delta configuration.

13. The system of claim 11, further comprising:

one or more controllers configured to control the first switch, the second switch, and the third switch to each open or close.

14. The system of claim 8, further comprising:

a breaker switch, wherein each of the first inverter, the second inverter, and the third inverter includes a first half-bridge inverter and a second half-bridge inverter, and wherein the breaker switch includes (i) a first connection connected to a node of a voltage source and to each of the first half-bridge inverters, and (ii) a second connection connected to each of the second half-bridge inverters.

15. The system of claim 14, wherein the breaker switch is operable to open to disconnect each of the second half-bridge inverters from the node of the voltage source to configure the plurality of windings in a Wye configuration.

16. The system of claim 15, further comprising:

one or more controllers configured to control the breaker switch to open or close.

17. The system of claim 8, further comprising:

a bidirectional switch connected to the third inverter, wherein the bidirectional switch is operable to close to charge a battery.

18. A method comprising:

operating an inverter circuit to configure a plurality of windings of a motor in an Open Ended Winding configuration, the plurality of windings connectable to a first multi-phase inverter of the inverter circuit and a second multi-phase inverter of the inverter circuit;

determining that a parameter associated with the motor is beyond a threshold value; and responsive to determining that the parameter is beyond the threshold value, operating the inverter circuit to configure the plurality of windings in a Delta configuration by connecting a first end of a first winding of the plurality of windings with a first end of a third winding of the plurality of windings, a first end of a second winding of the plurality of windings with a second end of the first winding, and a second end of the third winding with a second end of the second winding.

19. The method of claim 18, further comprising:

operating the inverter circuit to configure the plurality of windings in a Wye configuration by disconnecting the second multi-phase inverter from a node of a voltage source.

20. The method of claim 18, wherein the parameter is one or more of temperature, rotational speed, available power, or requested power.

* * * * *